United States Patent [19]

Himes et al.

[11] Patent Number: 4,961,466
[45] Date of Patent: Oct. 9, 1990

[54] METHOD FOR EFFECTING CONTROLLED BREAK IN POLYSACCHARIDE GELS

[75] Inventors: Ronald E. Himes, Rush Springs; John A. Knox, Duncan, both of Okla.

[73] Assignee: Halliburton Company, Duncan, Okla.

[21] Appl. No.: 299,699

[22] Filed: Jan. 23, 1989

[51] Int. Cl.$^5$ .............................................. E21B 43/26
[52] U.S. Cl. .................................... 166/250; 166/308; 252/8.551
[58] Field of Search ................................ 166/308, 250; 252/8.551

[56] References Cited

U.S. PATENT DOCUMENTS

| | | | |
|---|---|---|---|
| 3,989,632 | 11/1976 | Fischer et al. | 252/8.551 X |
| 4,083,407 | 4/1978 | Griffin, Jr. et al. | 252/8.552 X |
| 4,541,485 | 9/1985 | Block | 252/8.551 X |
| 4,557,763 | 12/1985 | George et al. | 166/293 X |
| 4,579,670 | 4/1986 | Payne | 252/8.551 |
| 4,629,575 | 12/1986 | Weibel | 252/8.551 |
| 4,715,967 | 12/1987 | Bellis et al. | 252/8.551 |
| 4,797,216 | 1/1989 | Hodge | 166/308 X |
| 4,848,467 | 7/1989 | Cantu et al. | 166/281 |

*Primary Examiner*—Robert L. Stoll
*Assistant Examiner*—Gary L. Geist
*Attorney, Agent, or Firm*—Robert A. Kent

[57] ABSTRACT

A controllable breaker for use in viscosified fluids utilized in the treatment of subterranean formations comprising a low molecular weight condensation product of hydroxyacetic acid with up to 15 wt % cocondensing compounds containing other hydroxy-, carboxylic-acid, or hydroxycarboxylic-acid moieties. The condensation product has an average molecular weight in the range of from about 200 to about 4000, a generally crystalline structure, a melting point above about 100° C. and is substantially insoluble in the viscosified fluid at ambient temperatures. The breaker is admixed with the viscosified fluid in an amount sufficient to effect controlled breaking of the fluid upon being heated to a temperature above 70° F. within a subterranean formation.

9 Claims, No Drawings

METHOD FOR EFFECTING CONTROLLED BREAK IN POLYSACCHARIDE GELS

BACKGROUND OF THE INVENTION

1. Field Of The Invention

The present invention relates to viscosified fluids for stimulating subterranean formations or diverting in subterranean formations and to a method for delivering a material into a subterranean formation and more particularly a method for breaking a viscosified fluid in a subterranean formation.

2. Prior Art

In the drilling of a well and the subsequent recovery of fluids such as crude oil and natural gas from subterranean formations, various materials are added to the well bore or subterranean formation to improve the efficiency of the well drilling operation, to increase production of fluids from the formation and in some instances to terminate or seal portions of non-producing zones or wells. The treating agents are generally added in an active form above ground and flowed into a well bore or through the well bore into the subterranean formation.

For example, a subterranean formation is often subjected to a fracturing treatment to stimulate the recovery of fluids, such as crude oil, from the formation. In fracturing, a fluid is introduced in the well bore at a rate and pressure sufficient to produce one or more fractures in the formation and in some instances enlarge or extend existing fractures in a subterranean formation. The fluid can contain a propping agent such as sand or any of the higher strength materials such as resin coated sand, sintered bauxite or ceramic materials which is deposited in the fractures to maintain the fractures open to provide a passageway for the flow of fluids from the formation.

Hydraulic fracturing typically has been performed utilizing a high viscosity gelled aqueous fluid, a high viscosity hydrocarbon/water emulsion or a foam of a gas/water dispersion wherein the gas may initially be admixed either in gaseous or liquid form and subsequently gasified in the formation. These high viscosity fluids are capable of the necessary penetration into the subterranean formation to realize maximum benefits from the fracturing operation and in suspending the propping agent, if present, without excessive settling.

In some instances, viscous fluids described as diverting materials may be introduced into a well prior to or during a fracturing, acidizing, or gravel packing treatments. The viscous fluid which generally is a viscosified aqueous fluid, resists flow into the formation and may be used to obtain multiple fractures in a formation, help prevent undesirable fluids from contacting the formation, divert less viscous fluids and assist in obtaining packer seal in a well bore.

After the high viscosity aqueous fluid or stimulation fluid has been pumped into the subterranean formation and the stimulation treatment performed, it is generally desirable to convert the gel into a low viscosity fluid, thereby allowing the viscous fluid to be removed from the formation and desired material such as gas or oil to flow through the fractures into the well bore for recovery. This reduction in the viscosity of the viscosified fluid often is referred to as "breaking" the gel. Conventionally this breaking is effected by adding a viscosity reducing agent, commonly referred to as a "breaker," to the formation at the desired time. Unfortunately, the conventional known techniques often result in insufficient breaking when breaker concentrations are low, that is, insufficient reduction in the viscosity of the fluid, or premature breaking of the fluid when breaker concentrations are too high. Premature breaking of the fluid causes a reduction in the viscosity of the fracturing fluid or diverter prior to the desired termination of the stimulation operation, thereby reducing the overall effectiveness of the operation.

One method which has been proposed for controlling or delaying the activity of a breaker has been introduction of the active breaker material in a hollow or porous crushable bead or in encapsulated pills or pellets. The viscosity reducing agent or breaker is released immediately upon crushing of the beads which generally results from closing of the formation upon termination of the pumping operation. In some instances premature release can occur if the beads are broken during passage through the high pressure pumping equipment at the well bore. Inconsistent performance also can result in the formation because the stresses caused by the closing of the formation may be such that a large percentage of the beads remain unbroken, particularly if the closure is at a slow rate or a large number of beads may be crushed in one area while another has a much smaller quantity crushed resulting in an insufficient break in the fluid. The pills or pellets typically release the breaker upon hydration of the encapsulating agent which can vary over significant time periods.

Another method has utilized a coated breaker in which the coating is both crushable and permeable to at least one fluid in the formation whereby breaking can be effected by either mode of release.

Although the foregoing methods appear to provide for delayed release of a breaker into a subterranean formation, it remains desirable to provide an alternative method which is capable of providing equivalent or superior performance in commercial applications.

SUMMARY OF THE INVENTION

The method of the present invention comprises the addition of a quantity of a low molecular weight condensation product of hydroxy acetic acid with itself or compounds containing other hydroxy-, carboxlic-acid or hydroxycarboxylicacid moieties to a gelled fluid introduced into a subterranean formation which functions to provide a controlled break of the gelled fluid. The condensation products are friable solids with a melting point of generally greater than 150° C. and generally with a degree of crystallinity. They have a number average molecular weight of about 200 to about 4000 and preferably are oligomers having a number average molecular weight of from about 200 to about 2000. They are primarily trimers up through decamers. They are initially substantially insoluble in both aqueous and hydrocarbon fluids, however, upon exposure to the formation, will degrade at specific rates in the presence of moisture and temperatures above about 70° F. to form acidic compounds that will degrade or break the gelled fluid.

DESCRIPTION OF THE PREFERRED EMBODIMENT

The method of the present invention comprises the addition of a quantity of a selected breaker to a viscous gelled fluid prior to introduction into a subterranean formation whereby a controlled break of the gelled fluid subsequently can be effected. The selected breaker comprises a low molecular weight condensation product of (i) hydroxyacetic acid or (ii) hydroxyacetic acid cocondensed with up to 15% by weight of compounds containing hydroxy-, hydroxycarboxylicacid or carboxylic-acid moieties or combinations thereof. The compounds containing the moieties with which the hydroxyacetic acid is cocondensed are referred to herein as modifying molecules. The modifying molecules include but are not limited to lactic acid, tribasic acids, such as citric acid, diols such as ethylene glycol, and polyols. They also include difunctional molecules such as 2,2,-bis(hydroxymethyl) propanoic acid. Cocondensing hydroxyacetic acid with different modifying molecules produces varied physical and hydrolytic properties, thus permitting the breaker to be tailored to the formation in which it is to be utilized. Preferred modifying molecules are lactic acid, citric acid, adipic acid, 2,2,-bis(hydroxymethyl)-propanoic acid and trimethylolethane. The condensation product has a number average molecular weight in the range of from about 200 to about 4000. Preferably the condensation product is an oligomer having a number average molecular weight of from about 200 to about 2000 and comprises primarily trimers up through decamers.

The breaker preferably is prepared as a sufficiently hard or friable solid to allow it to be ground and handled as a solid having a high enough melting point that does not soften or begin to degrade until introduced into a subterranean formation. The percentages of hydroxyacetic acid and the cocondensed modifying molecules can be controlled to achieve sufficient crystallinity and softening point. Preferable, the melting point should be greater than 100° C. and generally greater than 150° C.

The condensation and cocondensation products utilized in this invention are prepared by methods well known in the art. The hydroxyacetic acid may be heated alone or with other cocondensing molecules described above in the presence of a catalyst such as antimony trioxide. The condensation is preferably carried out in an inert atmosphere and at 30 to 60 mm vacuum. By varying the percentage of hydroxyacetic acid and the cocondensed compounds as well as the temperature and time of condensation, it is possible to tailor the condensation product to degrade at different rates and temperatures. Different products can be physically or melt blended to achieve a wider range of degradation rates.

A more detailed explanation of the method of preparation of the breaker of the present invention is set forth in U.S. Pat. No. 4,715,967, the entire disclosure of which is incorporated herein by reference.

In accordance with the method of the present invention, the breaker comprising the described condensation product is admixed with a viscosified aqueous fluid in an amount sufficient to effect desired treatment in a subterranean formation. The quantity of breaker admixed with the viscosified fluid will vary over a wide range depending on the formation temperature and the rate at which it is desired to break the gelled treatment fluid within the subterranean formation. Generally, the breaker can be admixed with the viscosified fluid in an amount of from about 10 to about 200 pounds per 1000 gallons of viscosified fluid. For treatments wherein the subterranean formation has a temperature greater than about 150° F., condensation products of hydroxyacetic acid alone may be used. For temperatures below about 150° F., the crystallinity of the compound should be partially disrupted by cocondensation of the hydroxyacetic acid with the modifying molecules such as described above.

The breaker will cause a reduction in viscosity of a gelled treatment fluid in as little as 6 hours after attainment of the formation temperature, if desired, or the break time can be regulated to over 10 days before a significant reduction in viscosity occurs.

The treatment fluid containing the breaker is introduced into a subterranean formation in accordance with the particular stimulation treatment or diversion treatment in which it is incorporated. The specific method of introduction that is, fluid composition; flow rate, pressure and the like will depend upon the particular treatment being performed. The breaker can be admixed with the aqueous fluid in the treatment fluid in accordance with substantially any of the known methods of admixing solids with liquids whereby generally uniform admixtures are formed. Upon completion of the treatment, the breaker will effect a reduction in the viscosity of the fluid whereby the injected fluids can be flowed back through the well bore for recovery to facilitate clean-up and production from the well of desired hydrocarbons or the like.

The breaker of the present invention is effective in reducing the viscosity of fluids which have been viscosified with various solvatable polysaccharides or hydratable polymers having a molecular weight in excess of about 100,000. Suitable polymers may comprise gum ghatti, gum arabic, gum tragacanth, locust bean gum, gum karaya, guar gum, carrageenan, algin, biopolymers, hydroxyethylcellulose, hydroxyethyl ghatti gum, hydroxyethyl arabic gum, hydroxyethyl tragacanth gum, carboxymethyl locust bean gum, carboxymethyl karaya gum, carboxymethyl alginates, carboxymethyl carrageenan, carboxymethyl alignates, carboxymethyl xanthan gum, carboxymethylhydroxyethyl karaya gum, carboxymethylhydroxyethyl guar gum, carboxymethylhydroxethyl carrageenan, carboxymethylhydroxyethyl alginates, carboxymethylhydroxyethyl xanthan gum, carboxymethylhydroxyethyl cellulose, hydroxpropyl ghatti gum, hydroxypropyl arabic gum, hydroxypropyl tragacanth gum, hydroxypropyl bean gum, hydroxypropyl karaya gum, hydroxypropyl guar gum, hydroxypropyl carrageenan, hydroxypropyl alginates, hydroxypropyl xanthan gum, alkyl hydroxyethyl cellulose, carboxymethyl starch, hydroxyethylstarch, carboxymethylhydroxyethyl starch and mixtures thereof.

The most preferred gelling agents for use in the present invention are guar gum, hydroxypropylguar, carboxymethylhydroxypropylguar, hydroxyethylcellulose and vicinal diol derivatives thereof and carboxymethylhydroxyethylcellulose.

The breaker also is effective in reducing the viscosity of fluids containing the foregoing polymers or gelling agents which have been crosslinked through the addition of a metal ion-containing compound to the viscosified fluid to increase the viscosity of the fluid. The crosslinking metal ions can include titanium, zirconium, aluminium, antimony and the like.

To illustrate the present invention, but not by way of limitation, the following examples are provided.

EXAMPLE I

To illustrate the ability of the breaker of the present invention to function in high viscosity gels, several 200 ml viscosified fluid samples were prepared. The samples were prepared by preslurrying vicinal diol derivatized hydroxyethylcellulose in a mixture of 70% isopropyl alcohol and 30% ethylene glycol at a ratio of 0.267 gm/ml. Then 9 ml of the slurry was added to a Waring Blendor containing 200 ml of 14.2 lb/gal $CaBr_2/CaCl_2$ brine and mixed for one hour to allow the gelling agent to hydrate. The pH of the sample was adjusted to about 3-3.5 by the addition of a small quantity of 15% hydrochloric acid solution and a quantity of a zirconium ion-containing crosslinker was admixed with the gel. Break time tests then were performed by placing the gelled fluid samples together with a quantity of the hydroxyacetic acid breaker set forth in Table I, below, which was added concurrently with the crosslinker, into sample bottles containing a marble. The sample bottles then were placed into a 170° F. water bath. When the marble would fall through the gel at a rate similar to that of a marble in water, the gelled fluid was considered to be broken.

TABLE I

| Concentration of Breaker, lb/1000 gal | Time until break |
|---|---|
| 10 | 9 days |
| 20 | 4 days |
| 30 | 3 days |
| 40 | 2 days |
| 50 | 1 day |
| 60 | 17 hours |

The various break times achieved using different concentrations of the breaker clearly illustrate the ability to controllably break viscosified fluids with the breaker of the present invention.

EXAMPLE II

To illustrate the ability of the breaker to function in various density brines which would be utilized in completion operations, fluid samples were prepared as in Example I using the brines set forth in Table II. The test was performed as in Example I using a water bath at 170° F. The breaker was present in an amount equivalent to 50 lb/1000 gal. of fluid. The results are set forth below.

TABLE II

| Brine Formulation | Brine Density | Break Time |
|---|---|---|
| $NaCl/CaCl_2$ | 11.0 | 17 hrs |
| $CaCl_2/CaBr_2$ | 12.0 | 17 hrs |
| $CaCl_2/CaBr_2$ | 13.0 | 20 hrs |
| $ZnBr_2$/Seawater | 14.0 | 23 hrs |
| $CaCl_2/CaBr_2$ | 15.0 | 6 days |

The results clearly illustrate the ability of the breaker of the present invention to function in various density fluids.

While that which is considered to be the preferred embodiment of the invention has been described herein, it is to be understood that changes or modifications can be made to the method without departing from the spirit or scope of the invention as set forth in the following claims.

What is claimed is:

1. A method of breaking a viscosified fluid introduced into a subterranean formation penetrated by a well bore comprising:

(a) determining the temperature of the subterranean formation;

(b) selecting a solid particulate of a condensation product of hydroxyacetic acid with up to 15 wt % cocondensing compounds containing other hydroxy-, hydroxycarboxylic-acid or carboxylic-acid moieties, the condensation product having a number average molecular weight in the range of from 200 to about 400, being substantially crystalline at the temperature of the formation and having a melting point above about 100° C. and being sufficiently insoluble in the viscosified fluid at ambient temperature and degradable int ht epresence of an aqueous fluid at the temperature of the formation to form compounds capable of breaking a viscosified fluid;

(c) dispersing a sufficient amount of the condensation product of step (b) into a viscosified fluid whereby breaking of the viscosified fluid can be achieved upon placement int he subterranean formation, said sufficient amount comprising from about 10 to about 200 pounds per 1000 gallons of said viscosified fluid; and (d) placing the viscosified fluid containing the solid particulate condensation product of step (b) into a subterranean formation whereupon said product degrades and breaking of the viscosified fluid occurs.

2. The method of claim 1 wherein the condensation product is an oligomer having a number average molecular weight of from about 200 to about 2000.

3. The method of claim 1 wherein the cocondensing compound is at least one number selected for he group of lactic acid, citric acid, adipic acid, trimethylol-ethane and 2,2 bis(hydroxymethyl) propanoic acid.

4. The method of claim 1 wherein the cocondensing compound in said condensation product is lactic acid or citric acid.

5. The method of claim 1 wherein said viscosified fluid is prepared by hydration of a solvatable polysaccharide having a molecular weight in excess of 100,000 in an aqueous fluid.

6. The method of claim 1 wherein said viscosified fluid is prepared by hydration in an aqueous fluid of at least one member selected from he group of guar gum, hydroxypropyl guar, carboxymethylhydroxypropyl guar, hydroxyethylcellulose, vicinal diol derivatized hydroxyethylcellulose and carboxymethylhydroxyethylcellulose.

7. The method of claim 1 wherein the breaker degrades to form compounds which break the viscosified fluid by acid hydrolysis.

8. The method of claim 1 wherein the viscosified fluid contains a metal ion capable of crosslinking a gelling agent in said fluid and the breaker degrades to form compounds which chelate said metal ions whereby the viscosity of the fluid is reduced.

9. The method of claim 1 wherein the viscosified fluid contains a metal ion capable of crosslinking a gelling agent used to prepare said viscosified fluid such that a crosslinked viscosified fluid is formed and said breaker of step (b) is capable of degrading to form compounds which chelate the metal ions thereby reducing the viscosity of the crosslinked fluid and form compounds capable of degrading the gelling agent in said viscosified fluid.

* * * * *

UNITED STATES PATENT AND TRADEMARK OFFICE
CERTIFICATE OF CORRECTION

PATENT NO. : 4,961,466
DATED : October 9, 1990
INVENTOR(S) : Ronald E. Himes and John A. Knox It is certified that error appears in the above-identified patent and that said Letters Patent is hereby corrected as shown below:

In Column 5, line 6 delete --$CaBr^2/CaCl_2$-- and add $CaBr_2/CaCl_2$

In Column 6, line 9, delete -- 400 -- and add 4000

In Column 6, line 13, delete -- int ht epresence -- and add in the presence

In Column 6, line 20, delete -- int he -- and add in the

In Column 6, line 33, delete -- he -- and add the

In Column 6, line 45, delete -- he -- and add the
line 33, "for" should read --from--.

Signed and Sealed this

Tenth Day of November, 1992

Attest:

DOUGLAS B. COMER

Attesting Officer  Acting Commissioner of Patents and Trademarks